United States Patent [19]

Kominami et al.

[11] Patent Number: 4,791,956

[45] Date of Patent: Dec. 20, 1988

[54] CONSTANT FLOW VALVE

[75] Inventors: Naoya Kominami, Yokohama; Ikuo Yokoyama; Yuzi Shimanuki, both of Nobeoka, all of Japan

[73] Assignee: Asahi Yukizai Kogyo Co., Ltd., Miyazaki, Japan

[21] Appl. No.: 101,500

[22] Filed: Sep. 28, 1987

[51] Int. Cl.⁴ .............................................. F16K 17/32
[52] U.S. Cl. .............................. 137/503; 137/614.18; 251/337
[58] Field of Search .................... 137/503, 614.18; 251/337; 138/46

[56] References Cited

U.S. PATENT DOCUMENTS

| | | | |
|---|---|---|---|
| 2,866,477 | 12/1958 | Bredtschneider | 137/614.18 X |
| 3,138,174 | 6/1964 | Gilpin | 137/503 X |
| 3,884,447 | 5/1975 | Alexander | 251/339 X |
| 3,915,193 | 10/1975 | Rutt | 137/614.18 X |
| 3,955,595 | 5/1976 | Modes | 251/337 X |
| 4,463,929 | 8/1984 | Dantlgraber et al. | 251/337 X |

FOREIGN PATENT DOCUMENTS

| | | | |
|---|---|---|---|
| 1031315 | 6/1958 | Fed. Rep. of Germany | 137/503 |
| 57-057729 | 12/1982 | Japan. | |
| 59-231274 | 12/1984 | Japan. | |
| 60-241581 | 11/1985 | Japan. | |
| 62-068078 | 4/1987 | Japan. | |
| 62-096173 | 6/1987 | Japan. | |

Primary Examiner—Martin P. Schwadron
Assistant Examiner—Stephen M. Hepperle
Attorney, Agent, or Firm—Burns, Doane, Swecker & Mathis

[57] ABSTRACT

A constant flow valve comprising a valve casing having a flow passage having a curve due to a partition arranged between an inlet flow passage and an outlet flow passage, a chamber located above and between the inlet flow passage and the outlet passage, and an opening communicating the inlet flow passage with the chamber and tapered from the downstream side toward the upstream side; a cap attached to the valve casing and supporting a cylinder arranged coaxially with the opening and able to move forward and backward, and having a sealing surface at the lower end thereof which is pressed against a valve seat of the opening; a valve plug slidably fitted in the cylinder and having a through hole communicating with the opening, and arranged coaxially with the opening so that an orifice is always defined between the opening and the end of the valve plug; and a spring arranged between the valve plug and the cylinder, to bias the valve plug away from the opening.

6 Claims, 7 Drawing Sheets

CONSTANT FLOW VALVE

BACKGROUND OF THE INVENTION (1) Field of the Invention

The present invention relates to a constant flow valve used in liquid transport piping to ensure a constant flow rate for a domestic water supply, industrial water, water for irrigation, petroleum supply, and chemical liquids supply, or the like.

(2) Description of the Related Art

As automatic adjustable valves for a constant flow rate control, a constant flow valve having a constant flow rate control function and a preset flow rate change function, and a constant flow valve having a constant flow rate control function and an opening and shutting function are well known. The former is disclosed as a "Flow Constant Automatic Control Valve" in Japanese Examined Patent Publication (Kokoku) No. 57-57729, and the latter is disclosed as a "Fluid Valve" in Japanese Unexamined Patent Publication (Kokai) No. 59-231274.

The "Flow Constant Automatic Control Valve" disclosed in No. 57-57729 is provided with a narrowing flow portion in a flow passage of a valve casing, maintains a constant pressure differential upstream and downstream of the narrowing flow portion through a diaphragm type pressure differential adjusting valve operating in response to a detection of a pressure differential to control a flow rate to a constant value, and adjusts the section area of the narrowing flow portion by an umbrella-shaped adjusting device, thus enabling a change in a preset flow rate. However, this type, and other well known types of valves having a diaphragm type pressure differential adjusting valve, as well as throttle valves, must be provided with stop valves when an emergency valve closure is required, because the construction of these valves does not include an opening and shutting mechanism.

Also, although the "Fluid Valve" disclosed in No. 59-231274 can carry out a constant flow rate control and an opening and shutting operation, it can not change a preset flow rate.

Thus, in the prior art, a constant flow valve having three functions, i.e., a constant flow rate control function, a preset flow rate changing function, and in opening and shutting function, and having a simple and compact construction, is not known.

SUMMARY OF THE INVENTION

The object of the present invention is to provide a constant flow valve having a simple construction in which a preset flow rate can be automatically maintained even if a fluid pressure upstream and downstream of the valve is greatly changed, a preset flow rate can be easily changed, a flow rate control can be carried out over a wide range of from a low pressure differential to a high pressure differential, and an interception of a fluid flow can be made if necessary.

Another object of the present invention is to provide a constant flow valve capable of preventing rapid movement of a valve plug even if a pressure differential larger than a preset value occurs in a flow passage.

According to the present invention, there is provided a constant flow valve comprising; a valve casing having a flow passage including an inlet flow passage and an outlet flow passage, the flow passage having a curve due to a partition arranged between the inlet flow passage and the outlet flow passage, a chamber having an axis arranged at an angle to the axis of the inlet flow passage and located above and between the inlet flow passage and the outlet flow passage, and an opening communicating the inlet flow passage with the chamber and having an inner diameter which is gradually reduced from the downstream side toward the upstream side thereof; a cap attached to the valve casing and supporting a cylinder arranged coaxially with the opening and able to move axially forward and backward, and having a sealing surface at the lower end thereof which is pressed against a valve seat of the opening; a piston type valve plug slidably fitted in the cylinder, having an internal through hole communicating with the opening, and arranged coaxially with the opening so that an orifice is always defined between the opening and the end of the valve plug; and spring means arranged between the piston type valve plug and the cylinder, to bias the valve plug away from the opening.

According to a preferred embodiment of the present invention, the spring means biasing the valve plug away from the opening includes first and second springs, and the first spring is disposed between the upper portion of the valve plug and a first spring seat on the lower end of the cylinder or a second spring seat slidably fitted in the cylinder, and the second spring is disposed between the first spring seat and the second spring seat, whereby the valve plug is gradually moved forward and backward in response to a change in the fluid pressure.

According to a further preferred embodiment, the springs described above are made of metal covered with polychlorotrifluoroethylene resin, to ensure a high resistance to corrosion thereof.

DESCRIPTION OF THE PREFERRED EMBODIMENTS

FIGS. 1 to 4 show a first embodiment of the present invention.

Figure 1:
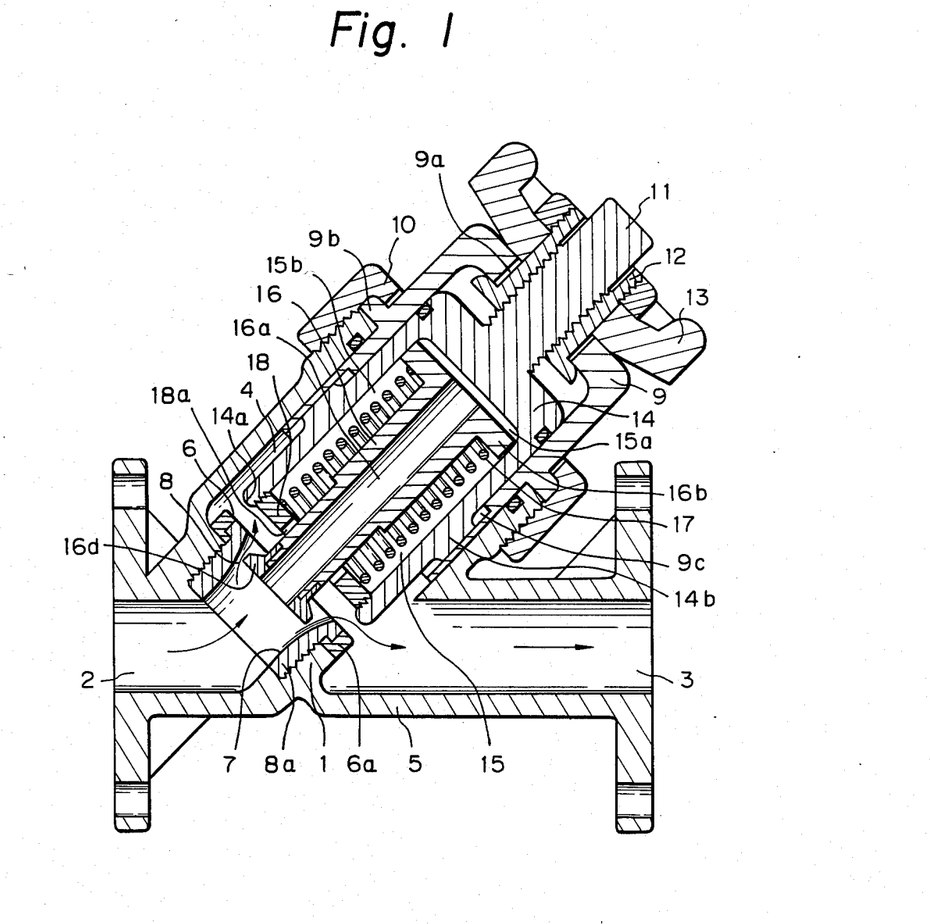
FIG. 1 is a longitudinal sectional view of a first embodiment according to the present invention.

In FIG. 1, numeral 5 designates the valve casing of a stop valve. The valve casing 5 comprises an inlet flow passage 2 and an outlet flow passage 3 having a curve due to a partition 1 arranged between the flow passages 2 and 3, and a chamber 4 located above and between the inlet flow passage 2 and the outlet flow passage 3. Numeral 7 designates an opening defined in the valve casing 5 and communicating the inlet flow passage 2 with the chamber 4. The opening 7 is defined by threadingly insertion an orifice tube 8a between the partition 1 and the inner wall of the valve casing 5 adjacent to and below the chamber 4, with a rubber elastic seat 6a forming a valve seat 6 interposed therebetween. The inner surface of the opening 7, i.e., the inner surface of the orifice tube 8a, is tapered from the downstream side toward the upstream side thereof, and the opening 7 is defined such that the flow passage 2 is turned at an oblique angle to the axis of the inlet flow passage 2. In the above embodiment, the opening 7 is defined by the orifice tube 8a, but this opening 7 may be defined such that the inner surface thereof is formed integrally with the partition 1 and the inner wall of the valve casing 5 adjacent to and below the chamber 4.

Numeral 9 designates a cylindrical cap attached to the valve casing 5 and provided with an opening 9a at the center portion of the upper end thereof. The lower end of the cap 9 is inserted above the chamber 4 and inside the valve casing 5, and a flange 9b projecting from the outer surface of the cap 9 is mated with the upper end of the valve casing 5. The cap 9 is fixed to the valve casing 5 by a cap nut 10 threadingly engaged with the outer surface of the valve casing 5 and pressing against the flange 9b.

A spindle 11 having an axis corresponding to the axis of the opening 7 and a bush 12 threadingly engaged with the spindle 11 are retained in the opening 9a of the cap 9.

Numeral 14 designates a cylinder formed integrally with the lower end of the spindle 11 and forming a chamber 15 therein. The axis of the cylinder 14 corresponds to the axis of the opening 7, and the lower portion of the cylinder 14 and a seal surface 14a on the lower end thereof are arranged in chamber 4 in such a manner that the cylinder 14 can slide forward and backward. The upper portion of the cylinder 14 is arranged in the cap 9 in such a manner that it can slide forward and backward therein.

The cylinder 14 is provided with a pair of guides 14b located diametrically opposite on the outer surface thereof. The guides 14b engage with a pair of guide grooves 9c formed in the lower inner surface of the cap 9 so that the cap 9 can move only up and down. Further, the lower end seal surface 14a may be provided with a packing to increase the sealing function when the valve is closed.

Numeral 16 designates a piston type valve plug having a through hole 16a arranged internally along the axis thereof and a flange 16b at the upper end thereof, and slidably fitted in the chamber 15 of the cylinder 14. The axis of the valve plug 16 corresponds to the axis of the opening 7, and the length of the valve plug 16 is such that an orifice 8 is always defined between the opening 7 and the lower end of the valve plug 16. In FIG. 1, the lower end of the piston type valve plug 16 is inserted into the opening 7. Namely, as shown in FIG. 1, the length of the piston type valve plug 16 is longer than the depth of the chamber 15 of the cylinder 14. A perforated plug 16d having a truncated conical flange is mounted on the lower end of the piston type valve plug 16. The lower end of the valve plug 16 may be fitted with a perforated plug having a flat flange, or may be a parallel piston without a perforated plug.

Figure 3:
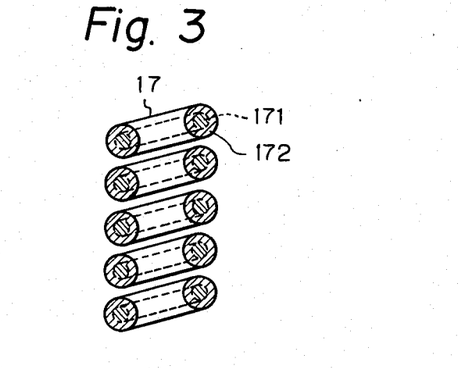
FIG. 3 is a longitudinal sectional view of the spring means used in the embodiment shown in FIG. 1.

Numeral 17 designates a spring arranged between the piston type valve plug 16 and a spring seat 18 (described later). The upper end of the spring 17 is pressed against the flange 16b of the valve plug 16 and the lower end thereof is pressed against the spring seat 18. Usually, the spring 17 is made of metal. However, as shown in FIG. 3, the spring 17 can be made of a metal 171 and completely covered with a polychlorotrifluoroethylene resin 172, to ensure a high resistance to corrosion. This type of spring enables the constant flow valve according to the present invention to be used for a long time while transporting a corrosive fluid.

As mentioned above, numeral 18 designates a spring seat located inside the lower inner surface of the cylinder 14. The spring seat 18 is provided with a through hole 18a to allow fluid to flow into and out of the cylinder 14. The shape of the spring seat 1 is not particularly limited, but is preferably ring-shaped, to prevent vibration of the valve plug. The through hole 18a may be defined on the inner surface of the spring seat 18 adjacent to the piston type valve plug 16, or a plurality of small through holes may be defined in the spring seat 18.

A handle 13 is fixed to the bush 12, and which is threadingly engaged with the spindle 11. As clear from FIG. 1, when the handle 13 is rotated, the spindle 11 and cylinder 14 move up and down. However, this construction is not limited, and the handle 13 may be directly fixed to the spindle 11, and thus the spindle 11 and cylinder 14 may be rotated by rotating the handle 13, so that the cylinder 14 is moved forward and backward. In this construction, the operation of the cylinder 14 is the same as that shown by the construction in FIG. 1.

The operation of the above-described embodiment will be explained hereinafter.

When a fluid is allowed to pass through the constant flow valve as shown in FIG. 1, part of the fluid arriving at the opening 7 is introduced into a primary pressure chamber 15a in the chamber 15 of the cylinder 14 via the through hole 61a provided in the piston type valve plug 16, and the remaining fluid passes through the orifice 8 defined by the opening 7 and the piston type valve plug 16 and flows out f the valve through the outlet flow passage 3 via the chamber 4 of the valve casing 5. A part of the fluid passing through the chamber 4 passes through a flow hole 18a formed in the spring seat 18 and is introduced into a secondary pressure chamber 15b in the chamber 15 of the cylinder 14. Note, since the primary pressure chamber 15a and the secondary pressure chamber 15b in the chamber 15 of the cylinder 14 are independently defined, and the valve plug 16 is slidably fitted in the cylinder 14 by the flange 16b thereof, the fluid in the primary pressure chamber 15a is prevented from leaking to the secondary pressure chamber 15b.

Figure 2:
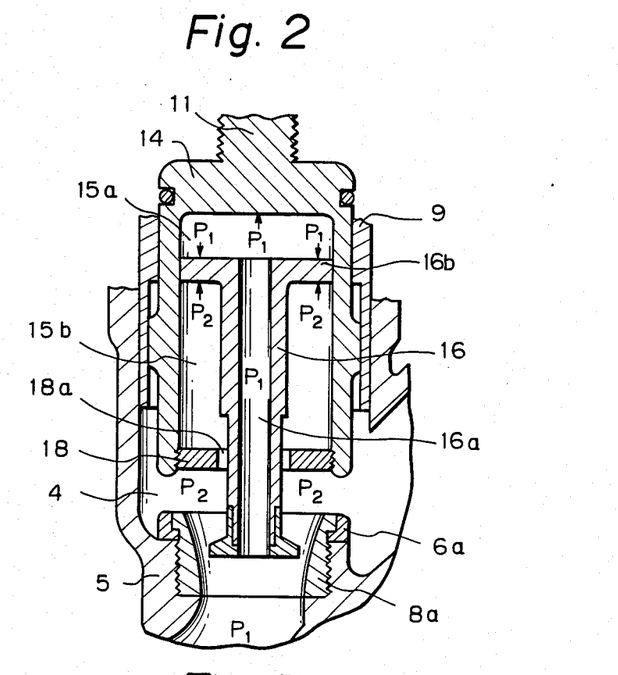
FIG. 2 is a longitudinal sectional view of a principal part of the embodiment shown in FIG. 1, wherein the spring means has been omitted.

As shown in FIG. 2, if the fluid pressure upstream of the orifice 8 is $P_1$ and the fluid pressure downstream of the orifice 8 is $P_2$, since the fluid upstream of the orifice 8 is introduced into the primary pressure chamber 15a, the pressure $P_1$ is applied to the primary pressure chamber 15a. Namely, the pressure $P_1$ is applied to the upper surface of the flange 16b of the piston type valve plug 16. On the other hand, since the fluid downstream of the orifice 8 is introduced into the secondary pressure chamber 15b, the pressure $P_2$ is applied to the secondary pressure chamber 15b. Thus, when a pressure differential occurs between the fluid upstream and downstream of the orifice 8, a pressure differential corresponding to the above pressure differential occurs between the primary pressure chamber 15a and the secondary pressure chamber 15b, and consequently, the piston type valve plug 16 is moved downward against the force of the spring 17 or is moved upward by the force of the spring 17, depending on the force created by the pressure differential between the upper and lower surfaces of the flange 16b.

This up and down movement of the piston type valve plug 16 causes the orifice 8 to be widened or narrowed, and thus the flow rate of the fluid passing through the orifice 8 is automatically adjusted.

Namely, for example, as shown in FIG. 1, if the fluid pressure upstream of the orifice 8 is increased or the fluid pressure downstream of the orifice 8 is reduced, the flow velocity of the fluid passing through the orifice 8 is increased, and thus the flow rate becomes higher than the preset value. However, since the pressure differential $P_1-P_2$ created between the upstream and downstream sides of tee orifice 8 becomes larger, the piston type valve plug 16 having the flange 16b is subjected to that pressure differential and moves downward to further narrow the opening area of the orifice 8, and thus the flow rate is decreased and is adjusted to the preset value.

Conversely, if the flow rate is reduced to a value lower than the preset value, due to a pressure fluctuation, the valve plug 16 operation is reversed, according to the same principle as above, to widen the opening area of the orifice 8, and thus the flow rate is automatically increased and is adjusted to the preset value.

Then, as shown in FIG. 1, if the handle 13 is rotated in the opening direction to move the spindle 11 and the cylinder 14 upward, the piston type valve plug 16 is also moved upward, the opening area of the orifice 8 becomes wider and the flow rate is increased, and thus, the preset value of the flow rate is increased. In this situation, even if the fluid pressure upstream of the orifice 8 is increased or the fluid pressure downstream of the orifice 8 is reduced, the flow rate is automatically adjusted according to the above-described operation of the valve assembly, and thus the new preset value of flow rate is constantly maintained.

On the other hand, as shown in FIG. 1, if the handle 13 is rotated in the closing direction to move the spindle 11 and the cylinder 14 downward, the piston type valve plug 16 is also moved downward, the opening area of the orifice 8 becomes smaller, and the flow rate is decreased. Thus, the preset value of flow rate can be reduced. Therefore, the new preset value of the flow rate also is constantly maintained by the same operation as above.

Subsequently, if the handle 13 is further rotated in the closing direction, to move the spindle 11 and the cylinder 14 downward, since the seal surface 14a at the lower end of the cylinder 14 is pressed against the rubber elastic seat 6a forming the valve seat 6 on the periphery of the opening 7 defined by the orifice tube 8a, the flow of the fluid from the opening 7 to the chamber 4 and the outlet flow passage 3 can be completely stopped. Namely, the constant flow valve is fully closed.

Figure 4:
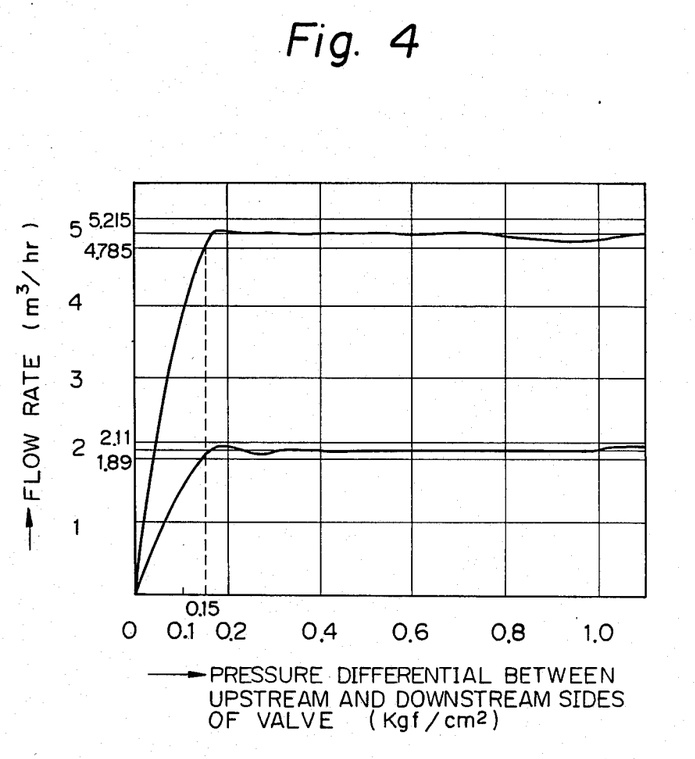
FIG. 4 is a graph showing the result of an experiment carried out with the embodiment shown in FIG. 1.

FIG. 4 is a graph showing the result of an experiment using the constant flow valve having the construction shown in FIG. 1 and having a bore diameter of 50 A. In the experiment, water at a normal temperature was allowed to flow through the constant flow valve at a preset flow rate of 2 m$^3$/hr and 5 m$^3$/hr, and the change in the flow rate was measured when the fluid pressure differential between the fluid upstream and downstream of the constant flow valve changed from 0 kgf/cm$^2$ to about 1.5 kgf/cm$^2$, for each condition.

Figure 5:
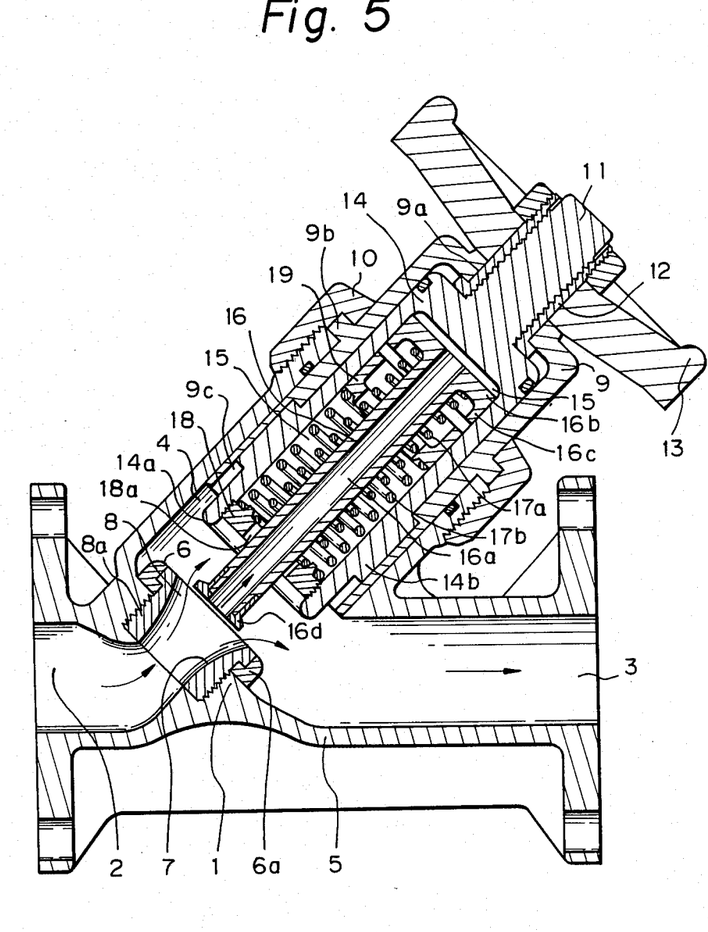
FIG. 5 is a longitudinal sectional view of a second embodiment of the present invention.
Figure 6:
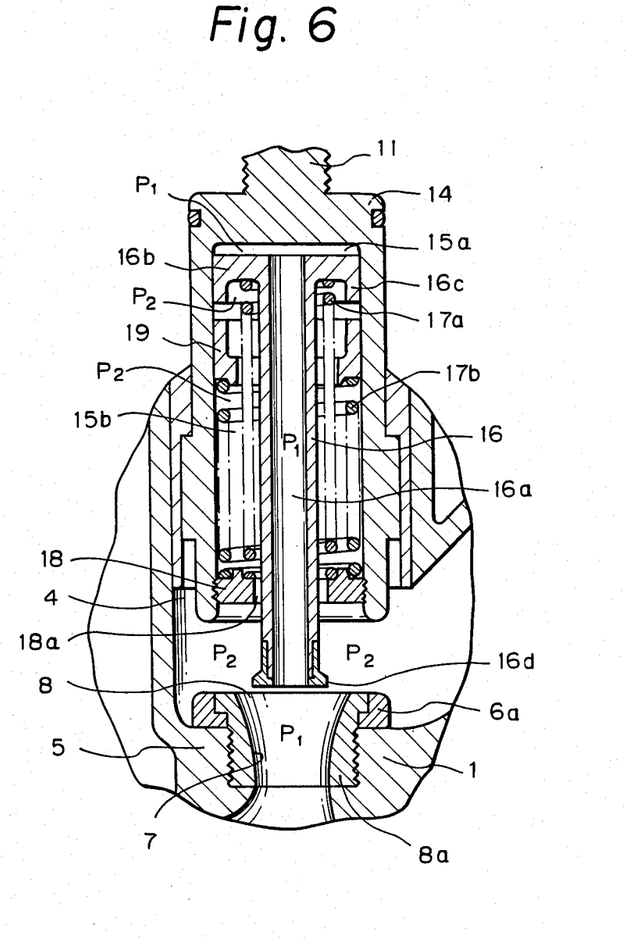
FIG. 6 is a longitudinal sectional view of a principal part of the embodiment shown in FIG. 5.

It can be seen from the graph in FIG. 4 that the above constant flow valve can maintain a constant flow rate at an accuracy of about ±4.3% for the flow rate of 2 m$^3$/hr and at an accuracy of about ±5.5% for the flow rate of 5 m$^3$/hr, and functions at a very low pressure differential of about 0.15 kgf/cm$^2$ FIGS. 5 and 6 show a second embodiment according to the present invention. In this embodiment, two springs bias the piston type valve plug.

Numerals 17a and 17b designate a first spring and a second spring, respectively. The upper end of the first spring 17a is pressed against the flange 16b of the piston type valve plug 16, and the lower end is pressed against a first spring seat 18. The upper end of the second spring 17b is pressed against a second spring seat 19 described hereinafter and the lower end is pressed against the first spring seat 18. The first and second springs 17a and 17b are made of metal completely covered with polychlorotrifluoroethylene resin, so that the springs have high resistance to corrosion. Since the construction of the first spring seat 18 is the same as that of the first embodiment, the description of the first spring seat 18 is omitted herein.

The second spring seat 19 is slidably fitted on the inner surface of the cylinder 14 and has a through hole at the center portion thereof. The first spring 17a is inserted in the through hole in such a manner that it does not come in contact with the second spring seat 19. Accordingly, after the piston type valve plug 16 has moved downward by a certain distance, the projection 16c of the valve plug 16 hits against the second spring seat 19, and thus the second spring seat 19 moves together with the piston type valve plug 16.

The operation of the second embodiment, except for those portions which are the same as for the first embodiment, will be described hereinafter.

When a pressure differential occurs between the fluid upstream and downstream of the orifice 8, a pressure differential corresponding to the above pressure differential occurs between the primary pressure chamber 15a and the second pressure chamber 15b, and consequently, the piston type valve plug 16 is moved downward against the force of the first spring 17a or is moved upward by the force of the first spring 17a, depending on the force exerted thereon due to the pressure differential at the upper and lower surfaces of the flange 16b.

This up and down movement of the piston type valve plug 16 causes the orifice 8 to be widened or narrowed, and consequently, the flow rate of the fluid passing through the orifice 8 is automatically adjusted.

On the other hand, when the opening 7 is designed so that the flow rate can be preset over a wide range, if a pressure differential higher than the designed pressure differential range occurs at any preset flow rate value, the dynamic balance between the force moving the piston type valve plug 16 and the elastic reaction force of the first spring 17a is continuously broken, and the piston type valve plug 16 tends to move rapidly in the upstream direction. At this time, the second spring 17b serves to prevent the rapid movement of the piston type valve plug 16. Namely, after the valve plug 16 has moved downward by a certain distance, since the projection 16c abuts against the second spring seat 19, and thereafter the valve plug 16 moves together with the second spring seat 19, the valve plug 16 is subjected to a strong elastic reaction force from the second spring 17b. Thus, a rapid movement of the piston type valve plug 16 is prevented and a stable dynamic balance is maintained. To ensure that this operation is effective, preferably the second spring 17b has a large spring constant.

Figure 7:
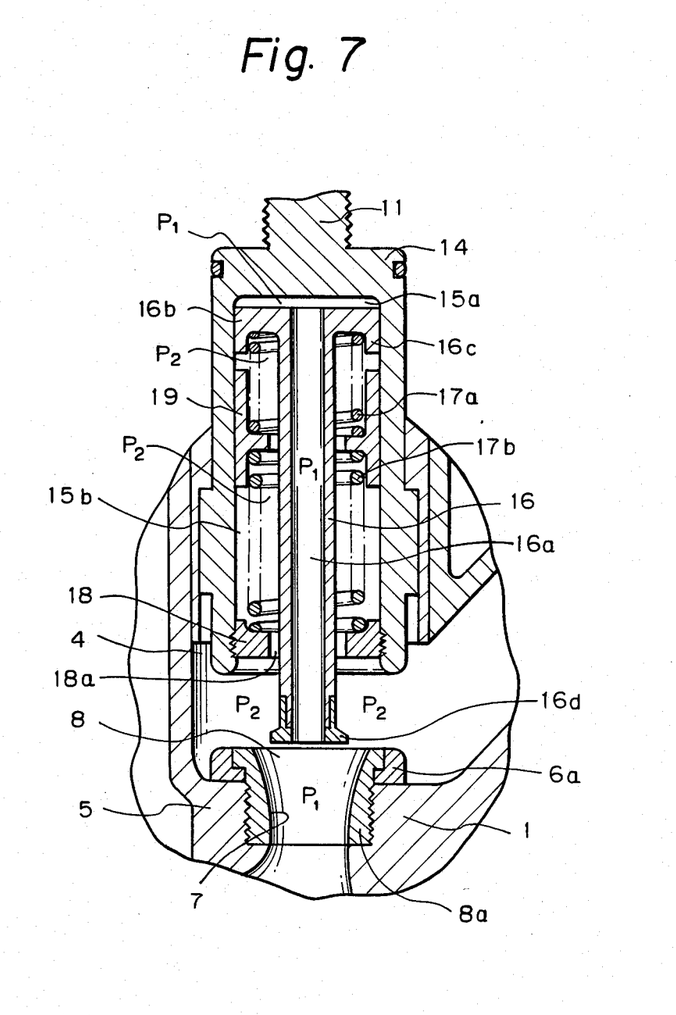
FIG. 7 is a longitudinal sectional view of a principal part of a third embodiment of the present invention; and, FIG. 8 is a graph showing the result of an experiment carried out with the second embodiment of the present invention shown in FIG. 5.

FIG. 7 shows a third embodiment according to the present invention.

In this embodiment, the first and second springs 17a and 17b are arranged in series through a second spring seat 19. A description of the construction of the other parts of this embodiment is omitted since it is the same as that of the second embodiment.

The first spring 17a is arranged so that the upper end thereof is pressed against the flange 16b of the piston type valve plug 16 and the lower end is pressed against the upper surface of the second spring seat 19. The second spring 17b is arranged so that the upper end thereof is pressed against the lower surface of the second spring seat 19 and the lower end is pressed against the upper surface of the first spring seat 18. The second spring seat 19 is perforated and is fitted around the shaft portion of the piston type valve plug 16 without coming into contact therewith, and is slidable on the inner surface of the cylinder 14.

Regarding the operation of the third embodiment, the relationship between the piston type valve plug 16, the first and second springs 17a, 17b, and the second spring seat 19 only will be described hereinafter, since the operation of the other parts of this embodiment is the same as that of the second embodiment.

In FIG. 7, when a pressure differential is applied to the upper and lower surfaces of the flange 16b of the piston type valve plug 16, the valve plug 16 is subjected to the force created by this pressure differential, and thus the valve plug 16 is moved downward or upward, against the force of the first and second springs 17a and 17b or by the force of the springs 17a, 17b, respectively.

If a pressure differential higher than the designed pressure differential occurs, the dynamics balance between the force moving the piston type valve plug 16 and the elastic reaction force from the first and second springs 17a and 17b cannot be maintained, and thus the piston type valve plug 16 tends to move rapidly downward. However, after the valve plug 16 has moved downward by a certain distance, the projection 16c of the valve plug 16 abuts against the second spring seat 19, and thereafter, the second spring seat 19 moves together with the valve plug 16. Namely, since the piston type valve plug 16 is mainly subjected to the strong elastic reaction force from the second spring 17b, a rapid downward movement of the valve plug 16 is prevented, and thus the stable dynamic balance is maintained. To ensure that this operation is effective, preferably the second spring 17b has a large spring constant.

Figure 8:
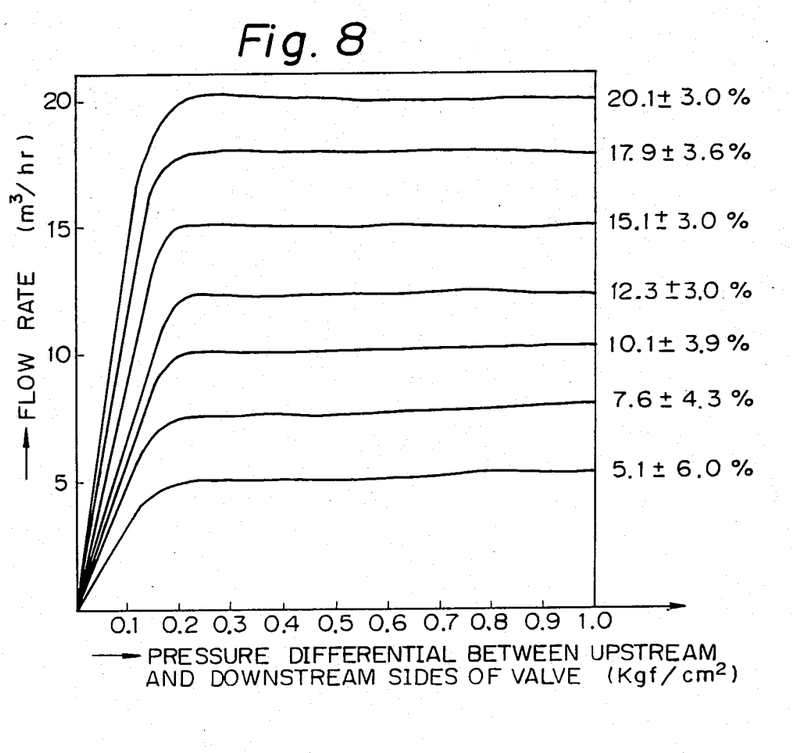

FIG. 8 is a graph showing the results of an experiment using the constant flow valve having the construction shown in FIG. 5 (note, the spring constant of the first spring 17a was 0.9 and that of the second spring 17b was 2.0) and having a bore diameter of 80 A.

The experiment was carried out under the following conditions.

Water temperature: 25° C.
  Preset flow rate: 5.0–20.0 m$^3$/hr
  Pressure differential between upstream and downstream sides of valve: 0–1.0 kgf/cm$^2$ It can be seen from the graph that, in the constant flow valve according to the embodiment, any preset flow rate can be obtained in the range of from 5.0 m$^3$/hr to 20 m$^3$/hr, and each preset flow rate value can be maintained at an accuracy of about ±3% to ±6%, and the constant flow valve operates stably over a wide pressure differential range of from a low pressure of 0.18 kgf/cm$^2$ to a high pressure of 1.0 kgf/cm$^2$.

According to the present invention, the following effects can be obtained.

(1) A constant preset flow rate is automatically maintained, even if the pressure differential between the upstream and downstream sides is greatly changed.

(2) The preset flow rate value can be changed over a wide range from a low pressure differential to a high pressure differential by a simple operation, and the changed preset value also can be maintained at a constant value.

(3) A separate stop valve is not necessary, since the constant flow valve is provided with an opening and shutting function.

(4) A constant flow rate control can be achieved at very small pressure loss.

(5) The constant flow valve can be manufactured at a low price, requires less installation space when used in piping, and maintenance and checking can be carried out easily, since the construction of the constant flow valve is simple and compact.

As stated above, according to the present invention, a constant flow valve having three functions including a constant flow control, a changeable preset flow rate value, and an opening and shutting function can be obtained.

We claim:

1. A constant flow valve comprising:
   a valve casing having a flow passage including an inlet flow passage and an outlet flow passage, said flow passage having a partition arranged between the inlet flow passage and the outlet passage which defines a curve in the flow passage, a chamber having an axis arranged at an angle to the axis of the inlet flow passage and located between the inlet flow passage and the outlet flow passage, and an opening communicating the inlet flow passage with the chamber and having an inner diameter which is gradually reduced from the downstream side toward the upstream side thereof;
   a cylinder arranged coaxially with the opening, and able to move forward and backward in the direction of the axis thereof and having a sealing surface at the lower end thereof which is pressed against a valve seat of the opening when the cylinder is moved in the forward direction;
   a cap attached to the valve casing and supporting the cylinder;
   a piston type valve plug slidably fitted in the cylinder and having an internal through hole communicating with the opening, the valve plug being arranged coaxially with the opening and being sized to define an orifice between the opening and the end of the valve plug at all slidable positions of the valve plug; and
   spring means arranged between the piston type valve plug and the cylinder, to bias the valve plug away from the opening.

2. A constant flow valve according to claim 1, wherein the spring means is made of metal covered with polychlorotrifluoroethylene resin.

3. A constant flow valve comprising:
   a valve casing having a flow passage including an inlet flow passage and an outlet flow passage, said flow passage having a partition arranged between the inlet flow passage and the outlet passage which defines a curve in the flow passage, a chamber having an axis arranged at an angle to the axis of the inlet flow passage and located between the inlet flow passage and the outlet flow passage, and an opening communicating the inlet flow passage with the chamber and having an inner diameter which is gradually reduced from the downstream side toward the upstream side thereof;

a cylinder arranged coaxially with the opening, and able to move forward and backward in the direction of the axis thereof and having a sealing surface at the lower end thereof which is pressed against a valve seat of the opening when the cylinder is moved in the forward direction;

a cap attached to the valve casing and supporting the cylinder;

a piston type valve plug slidably fitted in the cylinder and having an internal through hole communicating with the opening, the valve plug being arranged coaxially with the opening and being sized to define an orifice between the opening and the end of the valve plug at all slidable positions of the valve plug; and spring means arranged between the piston type valve plug and the cylinder, to bias the valve plug away from the opening, said spring means including a first spring and a second spring having different spring constants, at least one of said springs being arranged between the cylinder and a spring seat slidably fitted in the cylinder, whereby the valve plug is gradually moved forward and backward in response to a change in the fluid pressure.

4. A constant flow valve according to claim 3, wherein the springs are made of metal covered with polychlorotrifluoroethylene resin.

5. A constant flow valve according to claim 3, wherein said first spring and said second spring are arranged in parallel.

6. A constant flow valve according to claim 3, wherein said first spring and said second spring are arranged in series.

* * * * *